April 19, 1927.  
J. B. REILLY ET AL  
1,625,393  
TOOL FOR CUTTING PIPE IN WELLS  
Original Filed July 19, 1923
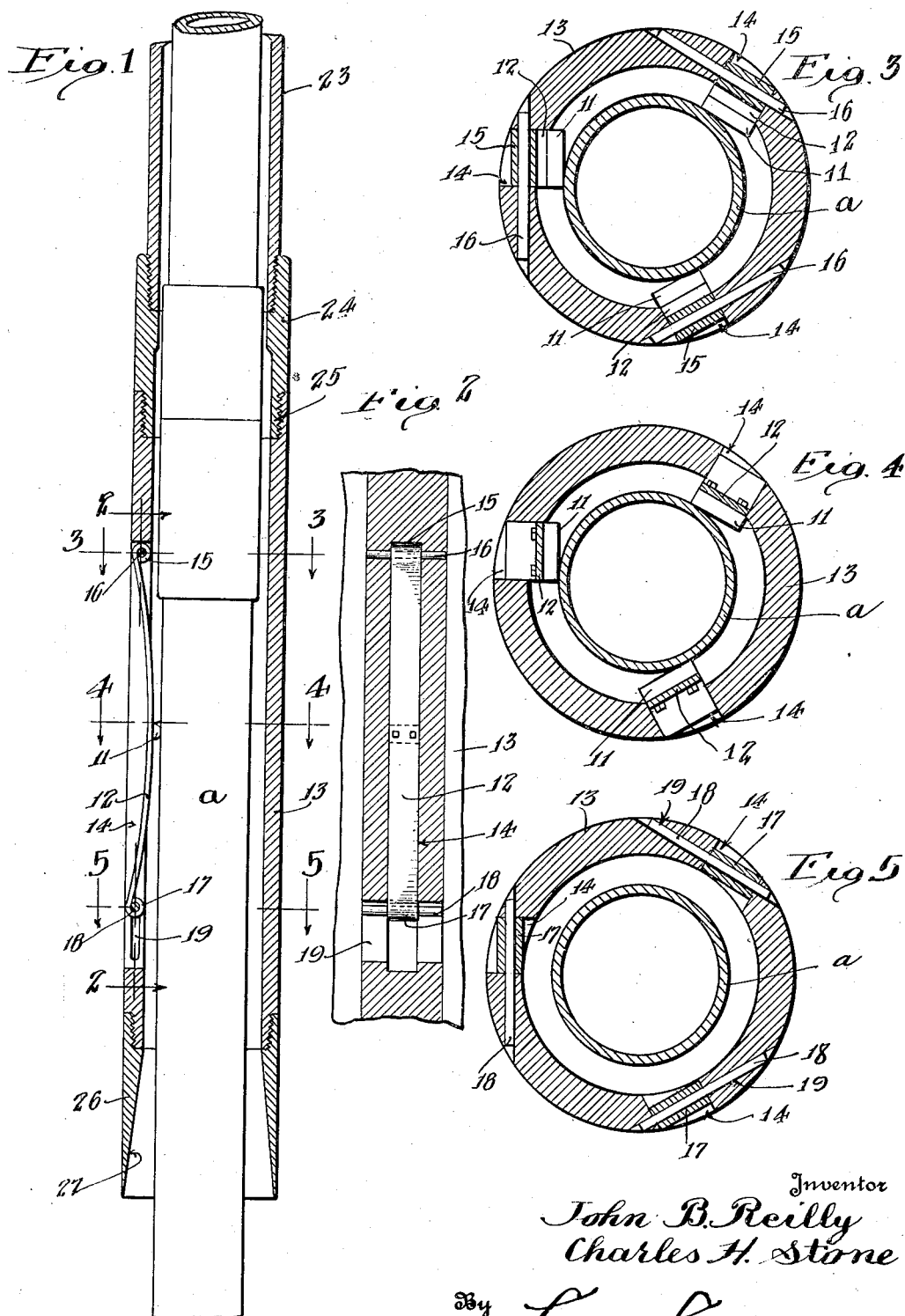

Patented Apr. 19, 1927.

1,625,393

UNITED STATES PATENT OFFICE.

JOHN B. REILLY, OF WHITTIER, AND CHARLES H. STONE, OF BREA, CALIFORNIA, ASSIGNORS TO KAMMERER CORPORATION, OF SANTA FE SPRINGS, CALIFORNIA, A CORPORATION OF CALIFORNIA.

TOOL FOR CUTTING PIPE IN WELLS.

Original application filed July 19, 1923, Serial No. 652,511, and in Great Britain October 8, 1923. Divided and this application filed January 20, 1925. Serial No. 3,643.

This invention relates to that type of tool employed in the well drilling art for cutting drill pipe or other tubing in the well. Such a tool is in frequent demand for cutting the drill pipe or stem when it or the bit becomes stuck in the hole.

The invention is an improvement over that disclosed in United States Letters Patent No. 1,277,600, issued to George Kammerer, September 3rd, 1918. This application is a division of our copending application filed July 19, 1923, Serial No. 652,511, which was a continuation as to certain common subject matter of our earlier application Serial No. 584,277 filed August 25, 1922.

An important object of this invention is to simplify the tool, reducing the number of working parts so as to make it less liable to get out of order while in use and so as to make its operation more reliable.

Another important object is to effect the mounting of the cutter blades in a manner to permit of the tool being inserted in the casing of small diameter relative to the diameter of the pipe to be cut within the casing.

Another object is to make provision for automatic feeding of the cutter blades to the pipe or stem being operated upon.

Another object is to provide for cutting of the pipe at any desired point without the necessity of coaction between the tool and the pipe collar or tool joint of the drill stem.

A further object is to mount the cutter blades in a manner to yieldingly hold them against the drill pipe and readily permit the cutter blades to pass the pipe collars and drill pipe joints.

The accompanying drawings illustrate the invention:

Figure 1 is a longitudinal section of a tool embodying the invention, a fragment of the member for raising it and a fragment of the pipe being operated upon also being shown.

Fig. 2 is a fragmental sectional elevation on the line indicated by 2—2, Fig. 1.

Figs. 3, 4 and 5 are enlarged plan sections on the lines indicated by 3—3, 4—4 and 5—5, respectively, of Fig. 1.

There is provided any desired number of cutter blades 11 movably mounted upon a tubular body 13. In this instance the cutter blades 11 are attached to members 12 which are movably mounted in longitudinally extending slots 14 in the body 13. One end of each of the members 12 is provided with an eye 15 through which passes a pivot 16 that is mounted transversely of the slot 14 in the upper end thereof. The cutter blades 11 are yieldingly pressed against the pipe $a$ that is to be cut and, for this reason, the members 12 are in the nature of springs and the lower ends of the members 12 are provided with eyes 17 through which pass pivots 18 that extend transversely of the slots 14 near the lower ends thereof.

The side walls of the slots 14 are provided with grooves 19 which constitute ways for the end portions of the pins 18. The springs 12 are normally bowed inwardly so as to yieldingly hold the cutter blades 11 against the pipe $a$.

The tubular body 13 is adapted to be lowered over the pipe or drill stem that is to be cut. Such pipe will be maintained substantially concentric of the body 13, while the cutting operation is progressing, because of the provision of three cutter blades arranged equidistantly around the body. When the tool is being lowered over the pipe, the cutter blades being inwardly and upwardly beveled on their lower faces, will drag over the tool joints and collars of the drill pipe and be deflected outwardly so as to pass the same.

The upper end of the tubular body 13 is suitably connected to the operating member which, in this instance, is formed by tubing 23, the connection between the tubing being effected by a coupling 24 to which the body 13 is screwed as indicated at 25.

In the drawings the body 13 is formed, in part, by a shoe 26 which is internally beveled outwardly and downwardly at its lower end at 27 so that, if the shoe strike an obstruction while it is descending, it will cut the obstruction away.

In practice, when it is desired to cut a string of drill pipe in the well, the tool will be lowered over the drill stem by means of the tubing 23 to the level at which the drill pipe is to be cut. Then the tubing 23 will be rotated by any of the usual mechanisms employed for such purpose, causing the cutter blades 11 to cut the drill pipe. As the depth of the cut increases, the springs 12 will feed the cutter blades inwardly until said blades cut entirely through the pipe.

After the cutting operation has been completed, the lower end of the cut off section of pipe will rest upon the cutter blades which are inwardly and upwardly beveled on their upper faces and the tubing 23 will be withdrawn from the well and with it the body 13 and its associated parts, thus raising the cut off section, or "fish" as it is commonly termed in this art. If it be necessary to remove more of the drill stem, the tool will be lowered again to make another cut and then raised to elevate the fish. Thus the cutting operations and raising of the cut off sections of the drill pipe will be continued until the well is cleared of the same, or as much of it as it is desired to remove.

It is to be especially noted that the cutter blades and their operating members 12 occupy very little radial space and enable the tool to be inserted in a casing of much smaller diameter, relative to the diameter of the drill pipe, than is possible with the tool disclosed in the above identified Letters Patent.

We claim:—

1. A tool of the character described comprising a tubular body having a longitudinally extending slot, a bowed spring, means securing one end of the spring in the slot, means shiftably mounting the other end of the spring in the slot, and a cutter blade on the spring.

2. A tool of the character described comprising a tubular body having a longitudinally extending slot, an inwardly bowed spring, means securing one end of the spring in the slot, means shiftably mounting the other end of the spring in the slot, and a cutter blade on the inner face of the spring.

Signed at Los Angeles, California this 15 day of January 1925.

JOHN B. REILLY.
CHARLES H. STONE.